OR 3,924,924

I 5UT3 Y

TX3046C

United St[illegible]

Fukuhara

[11] B 3,924,924

[45] Dec. 9, 1975

[54] HOLOGRAPHIC MEMORY UTILIZING A CHANGEABLE PHASE OBJECT AND COHERENT SUBTRACTION

[75] Inventor: Akira Fukuhara, Tachikawa, Japan

[73] Assignee: Hitachi, Ltd., Japan

[22] Filed: Sept. 18, 1973

[21] Appl. No.: 398,551

[44] Published under the Trial Voluntary Protest Program on January 28, 1975 as document no. B 398,551.

Related U.S. Application Data

[62] Division of Ser. No. 206,391, Dec. 9, 1971, Pat. No. 3,781,084.

[30] Foreign Application Priority Data

Dec. 9, 1970 Japan .............................. 45-108530
Dec. 25, 1970 Japan .............................. 45-130687

[52] U.S. Cl. ............................ 350/3.5; 340/173 LM
[51] Int. Cl.$^2$ ........................ G03H 1/16; G03H 1/26
[58] Field of Search ....... 350/3.5, 150; 340/173 LT, 340/173 LM

[56] References Cited

UNITED STATES PATENTS 3,559,185 1/1971 Burns et al. ......................... 350/150
3,586,415 6/1971 Kumada et al. ...................... 350/150

OTHER PUBLICATIONS

Collins, Applied Optics, Vol. 7, No. 1, Jan. 1968, pp. 203–205.

*Primary Examiner*—Ronald J. Stern
*Attorney, Agent, or Firm*—Craig & Antonelli

[57] ABSTRACT

A pattern generating device includes a plurality of biaxial birefringent irregular ferroelectric crystal elements, each crystal being cut such that mutually opposing planes are normal to any one of the *a*-, *b*- and *c*-axis that a thickness between the planes is that of a half-wave plate, said crystal elements being arranged in the form of a matrix on an identical plane normal to incident light, a required information pattern being recorded on a photosensitive medium in a manner that elements corresponding to the information pattern are manipulated by a threshold voltage applied to the Z-planes of the respective elements, so that a large-capacity information recording method can be carried out.

8 Claims, 14 Drawing Figures

HOLOGRAPHIC MEMORY UTILIZING A CHANGEABLE PHASE OBJECT AND COHERENT SUBTRACTION

This is a division of application Ser. No. 206,391 filed Dec. 9, 1971, now U.S. Pat. No. 3,781,084.

BACKGROUND OF THE INVENTION

The present invention relates to a pattern generating device utilizing a special ferroelectric crystal, and a method of recording the generated pattern.

U.S. Pat. No. 3,559,185 discloses that a device comprising a combination of quarter-wave Z-plate ( a $Gd_2(MoO_4)_3$ is abbreviated GMO, plate in which the thickness between the mutually opposing Z-planes corresponds to the thickness of a quarter-wave plate) and a quarter-wave plate, each being made of the single crystal of $Gd_2(MoO_4)_3$, arranged between a polarizer and an analyzer to be used as a light shutter device, and the light shutter device is arranged in the form of a matrix in a two-dimensional space normal to incident light, thereby causing the respective element light shutter devices to generate predetermined patterns by light shutter action.

The device of the above construction, however, has been disadvantageous as stated below.

1. In practical use, the light incident on the quarter-wave $Gd_2(MoO_4)_3$ plate is not normally incident but is incident at a slight inclination. In addition, in order to expose different positions on a hologram medium to light, light should be irradiated upon the element light shutter device in a deflected manner and, hence, it is not always normally incident. In case of inclinded light incidence, the optical path length of the permeating light varies due to the biaxial birefringent property of the employed ferroelectric substance $Gd_2(MoO_4)_3$ so that the prior art device does not perfectly function as quarter-wave plate. Differences are accordingly produced in the ratio of intensities for switch-on and -off states of the particular light shutter. More specifically, from the viewpoint of crystal optics, $Gd_2(MoO_4)_3$ is a biaxial and birefringent crystal. Refractive indexes $n_\alpha$ , $n_\beta$ and $n_\gamma$ for light having polarization planes in the crystal axes -*a*, -*b* and -*c* directions, respectively, are $$n_\alpha = 1.836$$
$$n_\gamma = 1.896$$
$$n_\beta - n_\alpha = 4 \times 10^{-4}$$

with respect to light of a wavelength 6328(He- Ne laser). As calculated from them, in order to secure a ratio of intensities for the switch-on and -off states of at least $1 : 10^3$ as is necessary for practical use, the deviation in the direction of irradiation upon the quarter-wave $Gd_2(MoO_4)_3$ plate should be made within 1° 20′. The degrees of angle scarcely differ for light in the visible region (4000A–7500A) and double the value is never exceeded. Therefore, in order to strictly operate the light shutter device and the pattern generating device, the incident direction of the irradiated light upon the quarter-wave $Gd_2(MoO_4)_3$ plate should be restrained within at most 1° 20′ with respect to the normal direction of the particular quarter-wave $Gd_2(MoO_4)_3$ plate.

2. Further, for a pattern generating device constructed by, as described above, arranging the light shutter devices within an identical plane normal to the irradiated light in the form of a matrix, when it is intended to record the Fourier transformation image of a generated pattern at a focal position by means of a Fourier transform lens having a focal length -*f*, there is a direction in which diffracted light beams among light beams permeating a light shutter device corresponding to the generated pattern image intensify one another.

For a better understanding of such a device and the principles of the present invention attention is directed to the drawings, wherein the characteristics of such patterns and the embodiments of the present invention are shown.

BRIEF DESCRIPTION OF THE DRAWINGS

Referring to FIG. 1, an intensity distribution appears which has the maximum peak at the center and some peaks gradually decreasing with distances from the center (in FIG. 1 character 1 represents the intensity of diffracted light, -*d* the distance between the centers of the light shutter devices, and λ the wavelength of incident light). In case of the intensity distribution having such peaks, the photo-sensitivity of an image recording medium is such that the medium is saturated for excessively intense light, whereas it is insensitive to weak light. With the system of the above pattern generating device, it is, accordingly, difficult to faithfully record and reproduce the generated pattern. It is, therefore, desirable that variations in the spatial intensity distribution of the image to be recorded are made as small as possible.

SUMMARY OF THE INVENTION

A principal object of the present invention is to provide a pattern generating device which reduces the dependency upon the incident angle of irradiated light.

Another object of the present invention is to provide a large-capacity recording method with the above-mentioned pattern generating device.

The present invention uses a single crystal belonging to a special group among ferroelectric substances, such as $Gd_2(MoO_4)_3$ and potassium dihydrogen phosphate (hereinbelow abbreviated as KDP), the ferroelectric substance being cut so that the mutually opposing planes of the crystal may be normal to any one of the *a*-, *b*- and *c*-axis, respectively, and that the thickness between the opposing planes may be one at which refractive indexes $n_\alpha$ and $n_\beta$ for light (of a wavelength $\lambda$) permeating through the particular crystal and having polarization planes parallel to the *a*- and *b*-axes produce a difference of half-wavelength from each other.

According to the present invention, a half-wave plate of the ferroelectric substance (e.g., $Gd_2$ $(MoO_4)_3$) cut as described above is arranged in such a manner that the cut plane thereof has the *a*-axis (or *b*-axis) within the plane and made parallel to the polarization plane of an incident linear polarization. The phase change (of half-wavelength) of permeating light is manipulated by a voltage which is applied in the direction *c*-axis of the half-wave ferroelectric plate. Accordingly, if the phase change is recorded and detected by any method, an electric signal applied to the half-wave ferroelectric plate may be converted into a binary light signal. For example, in a device wherein a plurality of half-wave ferroelectric plates are arranged within an identical plane normal to coherent irradiated light in the form of a matrix, it is possible to record information as a hologram in such a way that the respective element half-wave ferroelectric plates are manipulated so as to generate a predetermined pattern by applying the voltages, light having permeated through the plates is made an object beam, and that a separate reference beam is irradiated onto a photosensitive medium in a manner superposed upon the object beam (Embodiments 1 and 2). In this case, a reproduced image appears as a pattern of the phase changes. In addition, when an interference pattern with a flux of light emitted from an identical source of light is produced, it is also possible to record and detect information in the form of changes of brightness (Embodiment 3).

Figure 2A:
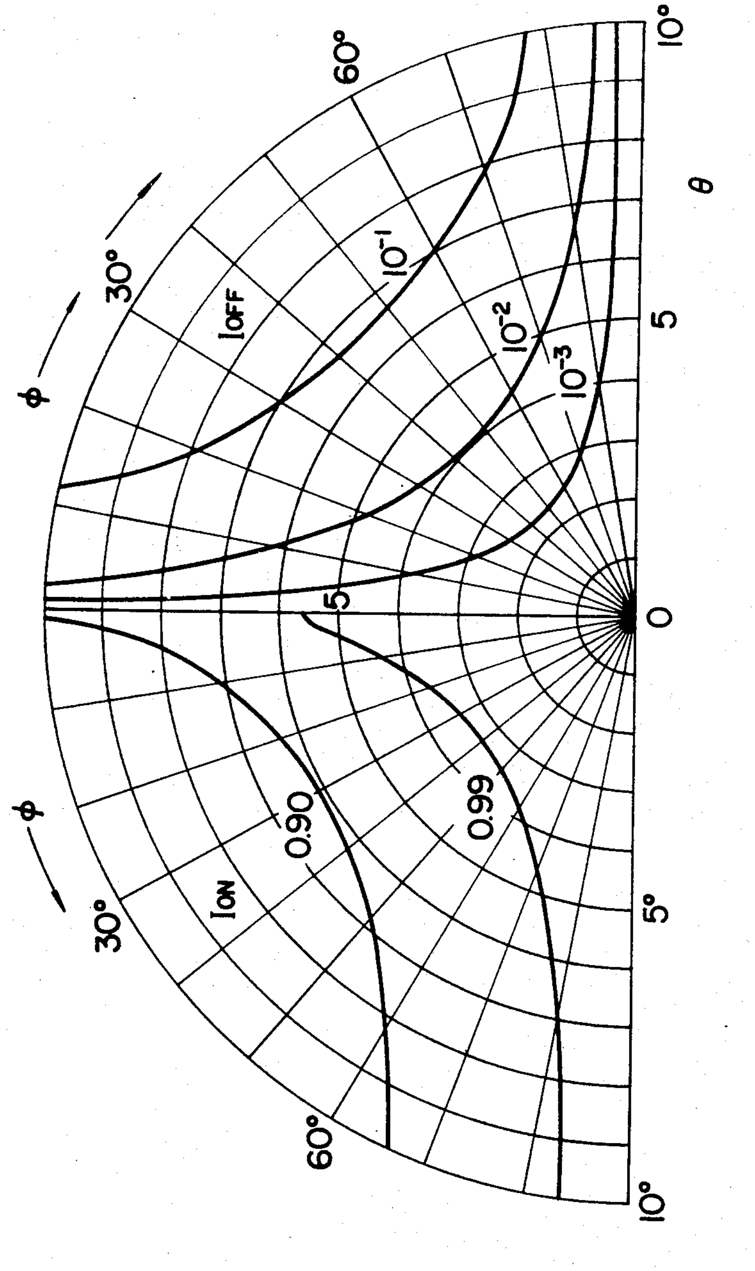
FIGS. 2*a* and 2*b* are contour maps of intensity distributions in light reconstructed from holograms obtained by double exposure, the distribution of which depend on incident angles of irradiated light upon Z-cut and Y-cut half-wave $Gd_2(MoO_4)_3$ plates of the present invention, respectively.
Figure 2B:
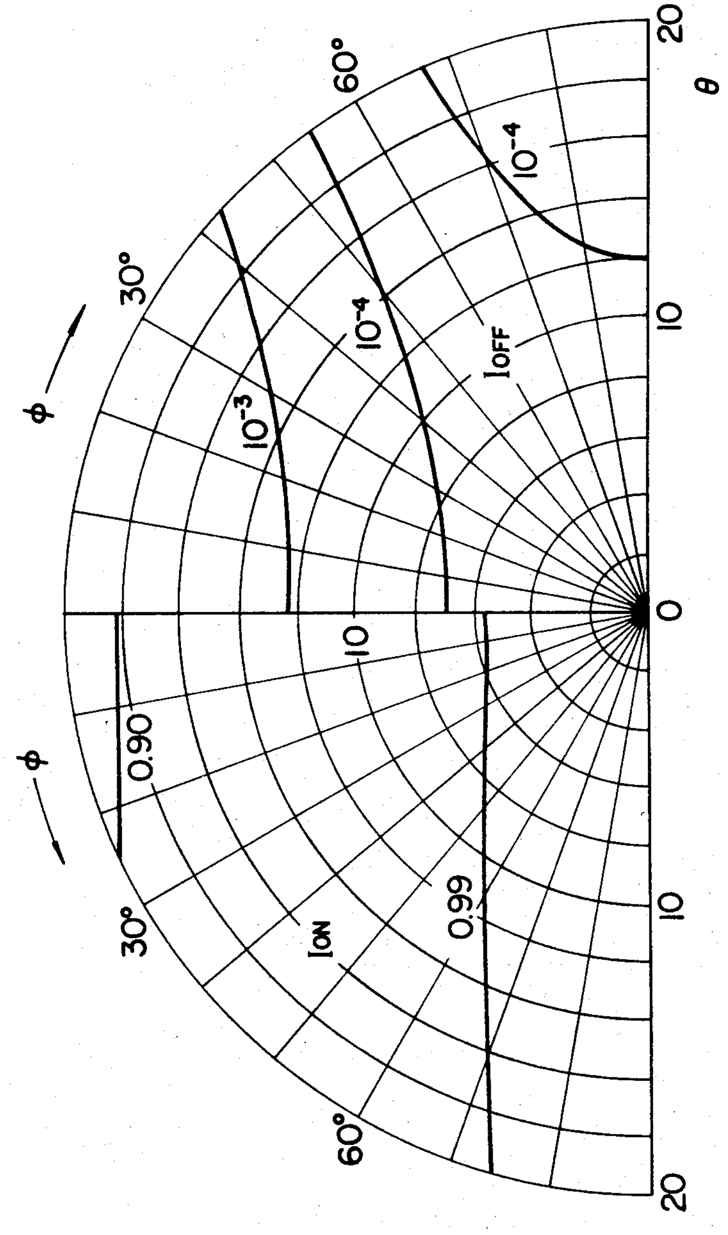
Figure 3:
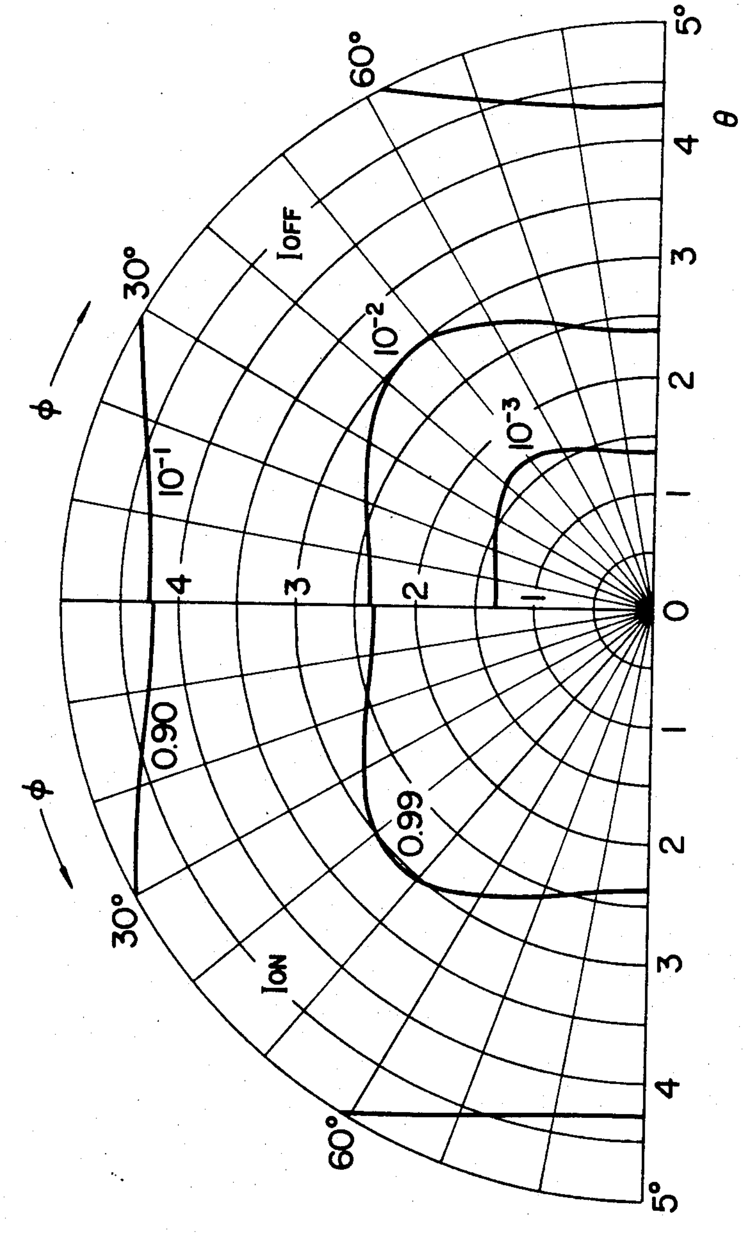
FIG. 3 is a contour map showing intensity distributions in the reconstructed light of a double-exposure hologram in the case of using a prior-art quarter-wave plate and before and after the inversion of polarization, the distributions of which depend on incident angles of irradiated light.

In case a hologram is prepared by means of the pattern generating devices with the half-wave ferroelectric plates of the present invention in a manner that light including a predetermined signal is information light, the recordinig of an "on" condition is effected by double exposure of the half-wave ferroelectric plates with their polarity (the sense of spontaneous polarization) left as it is, while the recording of an "off" condition is effected by double exposure with the polarity inverted (the sense of spontaneous polarization being changed by 180°). However, when the hologram is prepared with the crystal (half-wave ferroelectric plate) permeating light made the information light and reproduction is done therefrom, information light beams opposite in phase to each other are doubly and simultaneously reproduced from parts corresponding to the "off" state, and hence, the intensity is a cancelled low one. When light intensities $I_{off}$ reproduced or reconstructed from the double-exposure hologram with the polarity inverted and those $I_{on}$ without the inversion are evaluated, results in FIGS. 2*a*, 2*b* and 3 are obtained. The figures are given in the form of contour maps of the reconstructed light intensitites $I_{on}$ and $I_{off}$. The dependency of the intensities is represented only in the range of $0° \leqq \phi \leqq 90°$ because of the following symmetry expressed in terms of the angle $\phi$ defined between a plane containing an incident light ray as well as the normal of the crystal surface and the *a*-axis (or *b*-axis):

$$I(\phi) = I(-\phi) = I(180° - \phi)$$

Although natural, it is desirable that an angular region of a large value is wide for $I_{on}$, whereas that of a small value for $I_{off}$. From the viewpoint of practical use, the ranges are considered that $I_{on}>0.99$ and that $I_{off}<10^{-3}$.

FIGS. 2*a*, 2*b* and 3 illustrate $I_{on}$ and $I_{off}$ of a z-cut plate, a Y-cut plate (a single-crystal plate in which two opposing parallel planes are cut normally to the *a*-axis or *b*-axis) and a prior art quarter-waveplate, respectively. In the figures, $\theta$ represents an angle defined between the normal of the cut plane and the incident light, while $\phi$ designates, as referred to above, the angle which the plane containing the incident light ray and the normal of the cut plane defines with the *a*-axis (or *b*-axis).

In case of the Z-cut plate, as apparent from FIG. 2*a*, the direction of $\phi = 45°$ has the narrowest allowable range of $\theta$ of approximately 2.5°. In the directions of $\phi = 0°$ and 180°, the allowable ranges are wide.

As apparent from FIG. 2*b*, the Y-cut plate is much more convenient than the Z-cut plate. The allowable range of $\theta$ is the narrowest at $\phi = 0°$, and it may be taken up to $\theta = 12°$.

In case of the prior art quarter-wave plate, as apparent from FIG. 3, although the direction of $\phi = 45°$ is the widest in the allowable range, $\theta$ does not reach 2°.

Figure 1:
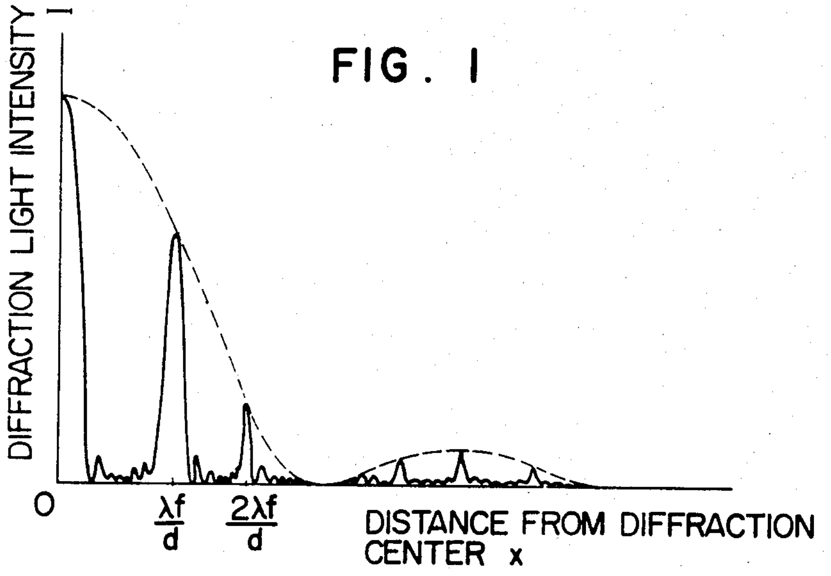
FIG. 1 is a characteristic diagram showing the state of intensity distribution in diffracted light on a recording medium for a hologram, resulting from a bit arrangement in matrix form.
Figure 4A:
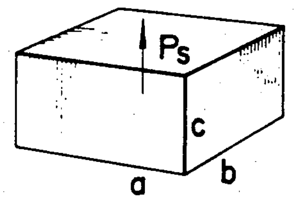
FIGS. 4*a* and 4*b* are model diagrams showing lattice states dependent on the senses of spontaneous polarization of $Gd_2(MoO_4)_3$ unit lattices, respectively.
Figure 4B:
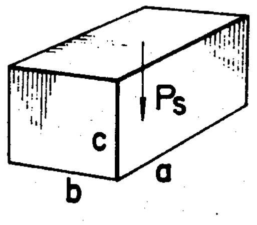

Crystals employed in the present invention as stated above, are $Gd_2$ $(MoO_4)_3$, KDP Rochelle salt, ammonium cadium sulphate, methyl-aluminum sulphate dodecahydrate, and crystallographically monomorphic substances of $Gd_2$ $(MoO_4)_3$ which have the formula of $(R_xR'_{1-x})_2O_3 \cdot 3Mo_{1-e}W_eO_3$ where R and R′ each represents one rare earth element, $-x$ a value of 0 to 1.0, and $-e$ a value of 0 to 0.2. The ferroelectric substances have such a property that, upon applying thereto an electric field or a stress which exceeds a threshold value inherent to the substance (the electric field of the fixed value shall be termed a coercive electric field, while the stress of the fixed value, a coercive stress, the sense of the electric polarization of the particular crystal is inverted or changed by 180°. Moreover, simultaneously with the 180° inversion of the polarization, a lattice deformation is generated which, as shown in FIGS. 4*a* and 4*b*, is equivalent to the replacement between the *a*- and *b*-axes. Herein, ferroelectric substances generating no deformation in the crystal lattice in dependence upon the positive and negative senses of the polarization shall be termed regular ferroelectric substances, while those generating the deformation shall be termed irregular ferroelectric substances. The above-mentioned $Gd_2$ $(MoO_4)_3$ and KDP belong to the irregular ferroelectric substances, while triglycine sulphate, titanium zirconate, barium titanate, etc. as have hitherto known as ferroelectric substances belong to the regular ferroelectric substances.

Figure 5:
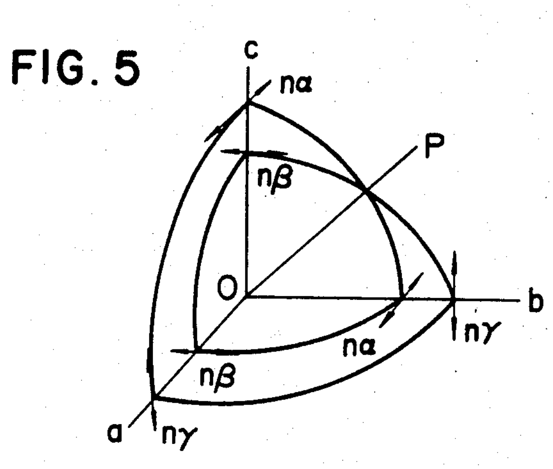
FIG. 5 is a diagram of the refractive-index curved surface of biaxial birefringence of an irregular ferroelectric substance.

From the viewpoint of crystal optics, an irregular ferroelectric substance is a biaxial birefringent crystal. A part of the refractive-index curved surface thereof is as shown in FIG. 5. In the figure, characters *-a*, *-b* and *-c* represent crystal axes, while $n_\alpha$, $n_\beta$ and $n_\gamma$ refractive indexes of light having polarization planes in the directions of the *a*-, *b*- and *c*-axis, respectively.

DESCRIPTION OF THE PREFERRED EMBODIMENTS

Description will now be made of the embodiments of the present invention:

Embodiment 1

Figure 7A:
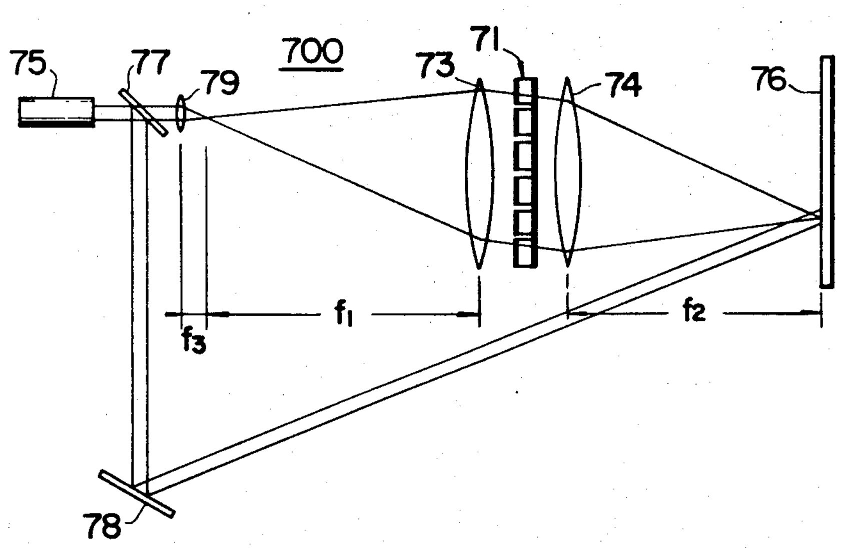
FIG. 7*a* is a diagram showing a hologram recording apparatus which uses a pattern generating device embodying the present invention.
Figure 7B:
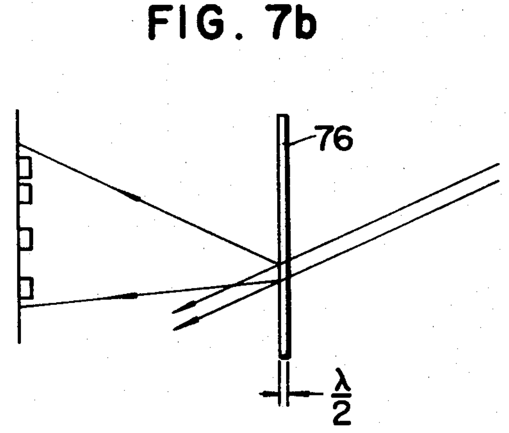
FIG. 7*b* is a diagram for explaining a method of reproducing a hologram which has been prepared by the hologram recording apparatus in FIG. 7*a;*

Illustrated in FIGS. 7*a* and 7*b* is an embodiment in which a pattern generating device of the present invention is utilized for a hologram forming apparatus.

Figure 6A:
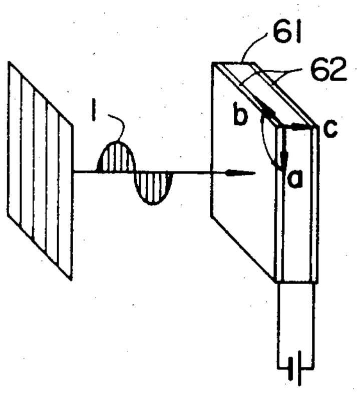
FIG. 6*a* is a perspective view showing a method of using a Z-cut half-wave ferroelectric plate according to the present invention.

A plurality of $Gd_2(MoO_4)_3$ crystal plates 61 in each of which, as shown in FIG. 6*a*, the thickness between the Z-planes (planes normal to the *c*-axis) corresponds to the thickness of a half-wave plate and transparent electrodes 62 are arranged on both the Z-planes, are arranged in the form of a matrix such that the Z planes of the respective elements are located on an identical plane nearly normal to incident light, and that the polarization plane of incident linear polarization and the *a*- or *b*-axis of the $Gd_2 (MoO_4)_3$ crystal plate are parallel to each other. Thus, the pattern generating device 700 (FIG. 7*a*) is constructed. Further, as shown in FIG. 7*a*, the pattern generating device 700 is disposed between two lenses 73 and 74. Utilizing coherent light radiated from a laser light source 75, a hologram of a pattern generated by the generator device 700 is recorded by object light and reference light onto a hologram recording medium 76 which is arranged substantially at the focal position of the lens 74. In FIG. 7*a*, numerals 77 and 78 represent semi-transparent mirrors, while 79 is a lens of a focal distance $f_2$ as is arranged at a position of $f_1 + f_3$ in front of the lens 73 (of a focal distance $f_1$). In the above hologram preparing apparatus, the pattern generation is carried out by applying a threshold voltage (a voltage required to invert spontaneous polarization by 180°) of the respective $Gd_2 (MoO_4)_3$ crystal plates through the transparent electrodes on the Z-planes of said $Gd_2 (MoO_4)_3$ crystal plates. The threshold voltage may be in any form insofar as the voltage component in the direction of the *c*-axis is equal to said threshold voltage. For example, even if the voltage is applied through the electrodes disposed on the Z-planes as in the above, the pattern generation may also be accomplished by irradiating an electron beam which establishes an electric field equal to the threshold voltage (threshold electric field) in the direction of the *c*-axis of the $Gd_2(MoO_4)_3$ crystal plates.

In case where the $Gd_2 (MoO_4)_3$ crystal plate is used together with a polarization plate being arranged, as in FIG. 6*a*, in front of (at the back of) the $Gd_2 (MoO_4)_3$ crystal plate with its polarization plane parallel to the *a*-axis(or *b*-axis)of the $Gd_2 (MoO_4)_3$ crystal plate, an effect equivalent to the replacement between the *a*- and *b*-axis may be imparted to the $Gd_2 (MoO_4)_3$ crystal plate by applying the threshold voltage to the Z-planes. Thus, the phase of a permeating linear-polarization light beam (having a polarization plane parallel to the *a*- or *b*-axis) is modulated. Therefore, the generated pattern recorded on the hologram medium 74 by means of the pattern generating apparatus comprising the $Gd_2 (MoO_4)_3$ crystal plates of such construction and constructed as in FIG. 7*a*, is obtained as an image at the position in the pattern generating apparatus at the recording of the hologram in such a way that, as illustrated in FIG. 7*b*, coherent light is irradiated upon the hologram recording medium 76 in a direction opposite to that of the reference light beam for the preparation of the hologram.

Figures 6B, 10:
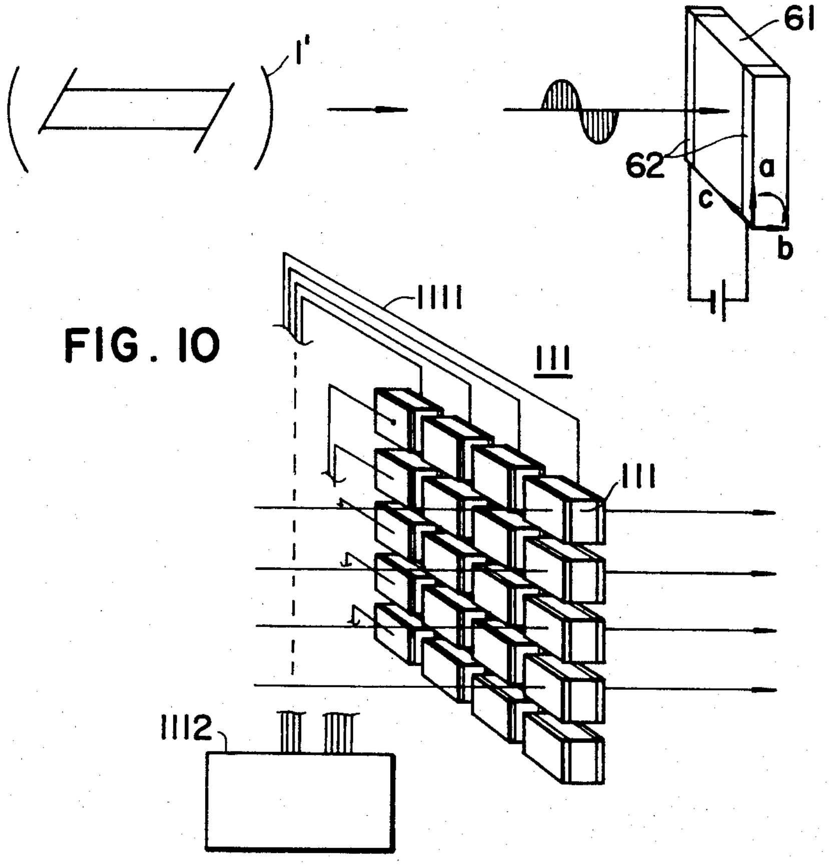
FIG. 6*b* is a perspective view showing a method of using a Y-cut half-wave ferroelectric plate according to the present invention.
FIG. 10 is a diagram showing an aspect of manipulating the pattern generating device of the present invention.

When, as shown in FIG. 6*b*, an interferable-light beam generating source 1' having a Brewster angle window is employed, it is not necessary to arrange the polarization plate in front of (or at the back of) the mutually opposing end faces of the $Gd_2 (MoO_4)_3$ crystal plate as is illustrated in FIG. 6*a*. The $Gd_2(MoO_4)_3$ crystal plate shown in FIG. 6*b* is cut such that the opposing end faces are normal to the *b*-axis (or the *a*-axis), and that the thickness between the end faces is equal to that of the half-wave plate. Provided on the mutually opposing Z-planes are electrodes 62, through which a voltage corresponding to the 180° inversion of the spontaneous polarization of the $Gd_2(MoO_4)_3$ crystal plate is applied.

Embodiment 2

Figure 8:
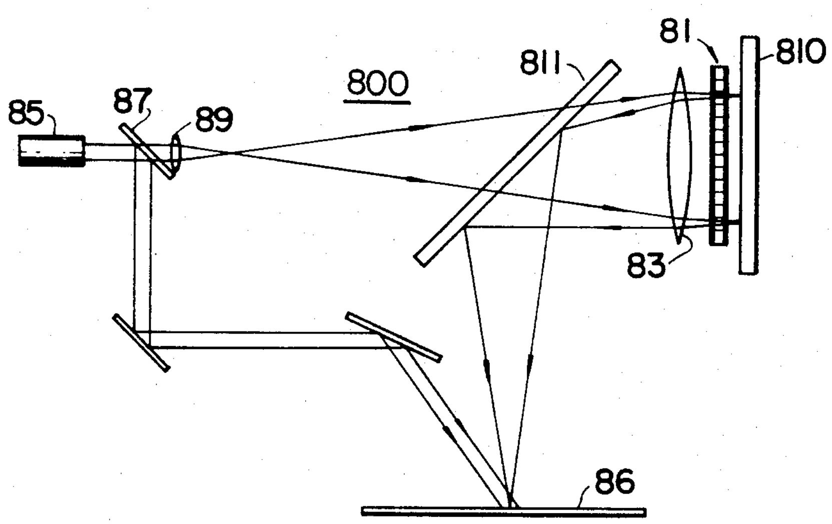
FIG. 8 is a diagram showing a method of forming a hologram with a pattern generating device of another embodiment of the present invention.

There will be described an embodiment which is used as an original plate for recording a hologram. A plurality of $Gd_2 (MoO_4)_3$ crystal plates are arranged in the form of a matrix such that the light incoming and outgoing planes thereof are located on an identical plane nearly normal to incident light, each element being cut so that the thickness *-d* between both the front and back end surfaces normal to the *c*-axis are defined by :

$$d = \lambda/4\ (n_\beta - n_\alpha)$$

with respect to the wavelength used, and being provided on the respective Z-planes with transparent electrodes. As illustrated in FIG. 8, light from an interferable-light source 85 is divided into two parts. One of the parts is transmitted through a lens 89 at the back of a semi-transparent mirror 87 arranged at an angle of 45°. Further at the back of a pattern generating device 800 consisting of the $Gd_2 (MoO_4)_3$ crystal plates a reflector 810 is arranged. The irradiation light beam is passed through the pattern generating device twice via a semi-transparent mirror 811, a lens 83, the pattern generating device 800 constituted by the $Gd_2 (MoO_4)_3$ crystal plates and the reflector 810. Thereafter, the beam is irradiated upon a hologram medium 86 by the semi-transparent mirror 811, to focus an inteference image with the reference light from the interferable-light source 85.

Both the foregoing embodiments 1 and 2 adopt the Fourier transform hologram recording system in order to enhance the recording density of the holograms. With this system, in case the bit arrangement (i.e., the arrangement of the $Gd_2(MoO_4)_3$ crystal plates on the pattern generating device is at equal spacing and in the form of a matrix, the concentration of the intensity distribution in the diffracted light of the permeating light beam from the respective bits occurs on the hologram recording medium.

This is an objectionable phenomenon in the characteristic of the photosensitive material, and in that the local presence of information should be avoided. To avoid the concentration, there is a method in which the phase on the information plate is disturbed independent of the "on" and "off" signals. The pattern generator of the present invention may simultaneously have the function of the phase impartation. More specifically, first, the voltage of random distribution is applied and the exposure in once carried out. Next, the polarity is inverted only at the bits intended for the "off" state, and the second exposure is carried out. It is necessary that the random phase distribution to be first imparted be a previously made one associated with information patterns, so as not to become a regular arrangement (for example, being entirely in-phase, being in-phase at every second line, etc.) in either of the two exposures. It is an advantage that the intensity concentration may be thus avoided.

Embodiment 3

As embodiment will now be explained in which input electric signals are detected and recorded in the form of a brightness pattern.

Figure 9:
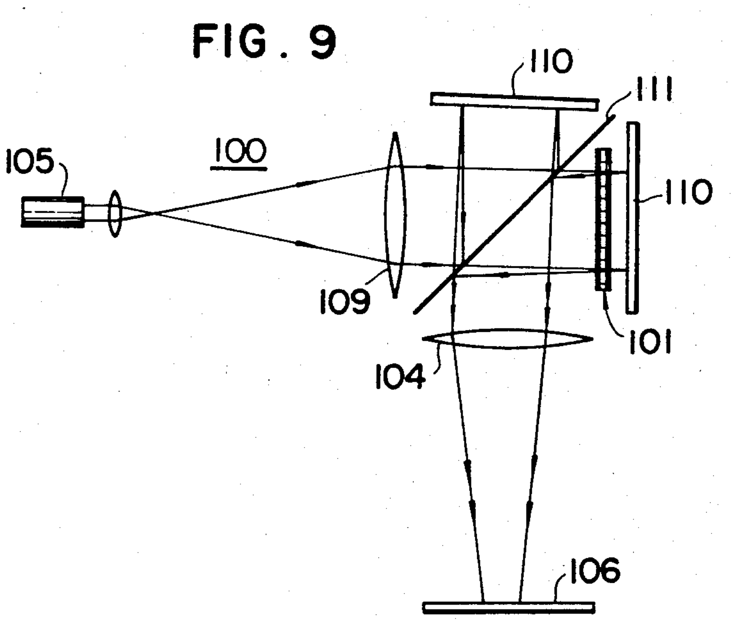
FIG. 9 is a diagram showing a method of preparing a hologram with a pattern generating device of still another embodiment of the present invention.

As shown in FIG. 9, a convex lines 109, a semi-transparent mirror 111 and a reflector 110 are arranged into a Twyman interferometer. One of light beams from an interferable-light source 105 is caused to impinge upon the interferometer through the convex lines 109. A pattern generating device 101 made of $Gd_2 (MoO_4)_3$ crystal plates, each being cut normally to any crystal axis and each thickness between both the front and back end surfaces corresponding to that of a quarter-wave plate, is interposed between the semi-transparent mirror 111 and the reflector 110 as in the figure. An image focusing lens 104 is so arranged as to focus a pattern generating image of the pattern generating device 101 onto a screen 106. If the optical path is previously adjusted so that the surface of the screen may become bright when a voltage applied to predetermined $Gd_2 (MoO_4)_3$ crystal plates of the device 101 is of a certain polarity, then portions corresponding to those parts of the device at which the voltage is inverted become dark.

Apart from the embodiment 3, when the Fourier transform holograms of the generated patterns are recorded on the hologram recording medium by the pattern generating devices of the embodiments 1 and 2, the generated patterns on the hologram recording medium are brought into dotty distributions consisting of sharp intensity concentrations in case where the $Gd_2 (MoO_4)_3$ crystal plates corresponding to the respective bits of the pattern generating devices are of an arrangement at regular intervals on said generating devices. This induces a variety of objections in, for example, maldistribution of the generated information, the balance of the intensity with the reference light, and limitation on the appropriate exposure region of sensitive materials.

It is known that, when the phases of light passing through the respective $Gd_2 (MoO_4)_3$ crystal plates of the pattern generating device are randomly disturbed, the intensity concentration on the hologram recording medium is weakened. Such an idea is stated by C.B. Burckhardt in a paper entitled "Use of A Random Phase Mask for the Recording of Fourier Transform Holograms of Data Masks" in "Applied Optics" published March, 1970, Volume 9, Pages 695 to 700. The method for random disturbance is realized in case of the embodiments 1 and 2 by arranging a random phase shifter, which makes the phases random, at the back of the pattern generating device. When, in the embodiments 1 and 2, the phase distribution given by the random phase shifter is fixed and the generated patterns are changed in succession, the information light intensities on the hologram recording medium are changed. Although the intensity concentration is weakened on the average in comparison with a case without using the fixed random phase shifter, objectionable patterns are present in the respective times of generated patterns. It is too troublesome that, in order to overcome such disadvantage, the fixed random phase shifter is replaced at each generated pattern. In the following embodiment, description will be made of a method of recording large-capacity information in the embodiments 1 and 2, which method is improved in the above respect.

Embodiment 4

The aspect of performance of this embodiment is illustrated in FIG. 7*a*, while a partial detailed view thereof is given in FIG. 10.

In FIG. 7*a*, a light beam emanating from a laser light source 75 is divided into two parts by a beam splitter 77. One of the divided light beams is made a thicker parallel light beam as information light by means of a beam expander 73. It passes through an information pattern generating device 71 having also the function of rendering the phases of the respective bits random (said device 71 being hereinbelow termed the random phase shifter). Thereafter, it is condensed by a Fourier transform lens 74 to a hologram forming plate 76 which is arranged on the focal plane of the lens. The other light beam separated by the beam splitter is used as a reference beam, and is reflected by a reflector 78. Thereafter, it impinges on the hologram recording medium 76 with an angle defined thereto, and interferes with the information light to form a hologram pattern including a predetermined information.

The random phase shifter 700 of embodiment 4 serves also as the information pattern generating device, and it is constructed as a pattern generating device 111 shown in FIG. 10. More specifically, each $Gd_2 (MoO_4)_3$ crystal plate 111 is formed such that both the front and back principal planes are orthogonal to the *c*-axis that the thickness between both the principal planes is an odd multiple of the thickness of a half-wave plate for the wavelength of the light used (for example $0.3\mu$ for the He-Ne laser light (0.6328)), and that is has an area of $250 \times 250\mu^2$. On the mutually opposing principal planes (Z-plane), transparent electrodes are arranged which are provided by, e.g., evaporating $SnCl_2$. N such $Gd_2 (MoO_4)_3$ elements (the number being increased or decreased dependent upon the state of use) are arranged at every interval of $250\mu$ as shown in FIG. 10, in such a manner that the corresponding principal planes are contained in an identical plane and that they have the relation of rows and columns. Thus, the pattern generating device 111' is made. Lead wires 1111 connected to the above-mentioned transparent electrodes of the respective $Gd_2 (MoO_4)_3$ crystal plates are connected to an electronic computer 1112 which stores therein N numerals of "1" or "0" arranged in a random order. Bits ($Gd_2 ( MoO_4)_3$ crystal plates corresponding to an information pattern to be generated in the information pattern generator and random phase shifter apparatus, are turned "on" through the electronic computer. Subsequently, a voltage of 300 to 400 V is applied through the electronic computer to the $Gd_2 (MoO_4)_3$ crystal plates which correspond to bits to be turned "off". An image of the random phase is thereby formed on the hologram sensitive plate 76. Subsequently, a voltage opposite in polarity to the above applied voltage is applied to the $Gd_2 (MoO_4)_3$ crystal plates which correspond to the bits to be turned "off", thereby inverting their polarization. An image is again formed on the hologram sensitive plate through the apparatus. Then, a hologram image of the predetermined information pattern is formed on the photosensitive plate.

While the principal planes of the crystal plate of the above $Gd_2(MoO_4)_3$ crystal plate utilize the Z-planes, the Y-planes (planes cut normally to the *a*- or *b*- axis of the crystal) may also be utilized. In this case, the voltages should, of course, be applied through the mutually opposing Z-planes as in the foregoing.

Further, since the laser light source employed in the present embodiment utilizes laser light (0.6328$\mu$) from a He-Ne gas discharge tube having a Brewster window, the emitted light is of P-polarization. It is, therefore, unnecessary to arrange a polarizer in front of the information pattern generating device. In general, however, in case where a source of interferable light not polarized is utilized, a polarizing plate should be disposed in front of the information pattern generating device.

As apparent from the foregoing description, the present invention may be summed up as follows:

1. An element which uses an irregular ferroelectric crystal, such as $Gd_2 MoO_4)_3$ and KDP, each set of end faces of said crystal as oppose to each other being cut such that they are normal to any one of *a*-, *b*- and *c*-axis and that the thickness -*d* between both the end faces is $$\frac{\lambda}{2(n_\beta - n_\alpha)} \cdot (P - ½)$$

with respect to permeating light (wavelength : $\lambda$) and where P represents a positive integral multiple, and in which a voltage sufficient to invert spontaneous polarization of said crystal is applied in the direction of the *c*-axis of said crystal, whereby a phase of linear polarization incident upon the cut plane of said element may be modulated by $\pi$;

2. A pattern generating device comprising a plurality of reversible half-wave phase modulator elements which are arranged in the form of a matrix on an identical plane normal to incident light.

3. A Fourier transform hologram recording method which weakens an intensity distribution of diffracted light due to the diffraction effect between light beams which have permeated through the respective elements of the pattern generating device.

More specifically, the irregular ferroelectric crystal being optically biaxial birefringent is cut such that its front and back principal planes are respectively orthogonal to the *a*-, *b*- or *c*-axis, and that the thickness between both the principal planes is an integral multiple of $\lambda/2\ (n_\beta - n_\alpha)$ with respect to the wavelength $\lambda$ of light permeating through the crystal to a difference $(n_\beta - n_\alpha)$ in the refractive index between birefringent lights in the permeating direction. A pluality of (N) such crystal elements are arranged such that the crystal axis within the principal planes of the particular crystal element is orthogonal to the incident polarization plane, that the corresponding principal planes of the respective elements are located on an indentical plane, and that the respective elements are located at the positions of rows and columns. The polarities of the elements are successively determined on the same lines as have been made for the "on" bits. The element arrangement in this state is subjected to irradiation of the laser light, and the Fourier transform hologram is prepared by the use of passing light.

Next, as the second step, the polarity of only the elements at the "off" bit positions is inverted, and a hologram pattern is exposed to light in a manner to be superposed on the hologram which has been exposed to light at the first step.

To the double-exposure hologram preparation, the function of the phase shifter is effective at either step in the form of being correlated with the information pattern. Therefore, during hologram exposure the intensity concentration may be remarkably avoided in comparison with the prior art. Considering reconstructed light from the double-exposure hologram since two phase-inverted light waves come to reconstruction image positions corresponding to the "off" bit positions, the image positions become dark as the result of interference. Ultimately, the reconstructed image appears as the intensity of light in conformity with the "on" and "off" pattern of the input information.

The image of the information pattern generating device which has phases randomly disturbed by the method thus associated with the input information pattern, is formed on the hologram recording medium. Thereafter, a voltage exceeding the coercive electric field of the particular irregular ferroelectric substance is applied to only those elements of the pattern generating device which correspond to the bits to be turned "off", thereby changing the senses of spontaneous polarization of the elements by 180°. The device is again subjected to the permeation of light. Thus, the double exposure is carried out into the hologram recording medium.

I claim:

1. A hologram preparing apparatus comprising:

an interferable-light source;

polarization means which is arranged in an optical path of light beams emitted by said interferable-light source, and which converts said interferable light beam into a linearly polarized beam;

a beam splitter which is arranged in an optical path of said linearly polarized beam converted by said polarizing means;

a pattern generating device including a plurality of reversible phase-modulating elements each comprising an irregular ferroelectric crystal plate in which each set of mutually opposing end planes are normal to one of *a*-, *b*- and *c*-axis, and a thickness between said end planes is prescribed with respect to a difference $\Delta n$ in the refractive index between light beams having a wavelength $\lambda$ and having their polarization planes respectively parallel to said *a*- and *b*-axis within the crystal and to a positive integer P by $$\frac{\lambda}{2 \cdot \Delta n} (P + ½), \text{ and}$$

means for applying a voltage, sufficient to invert the spontaneous polarization of said irregular ferroelectric crystal plate by 180°, to said irregular ferroelectric crystal plate and in parallel to said *c*-axis, said irregular ferroelectric crystal plates, which constitute the respective elements, being arranged on a plane normal to an incident linearly polarized beam so as to form a matrix among them, one of said *a*- and *b*-axis on said mutually opposing end planes of said each crystal plate being arranged in parallel to a polarization plane of said incident linearly polarized beam, which is arranged in an optical path of one of the linearly polarized beams split by said beam splitter, and which has the split linearly polarized beam as the incident linearly polarized beam;

a Fourier transform lens which is arranged in said optical path of said linearly polarized split beam of said beam splitter, and on one side of said pattern generating device;

a hologram recording medium which is arranged at a rear focal position of said Fourier transform lens; and optical means which directs the other linearly polarized beam, split by said beam splitter, to said hologram recording medium at a predetermined angle, whereby a hologram of a pattern image of said pattern generating device is prepared.

2. A hologram preparing apparatus according to claim 1, wherein said irregular ferroelectric crystal plate is made of $Gd_2 (MoO_4)_3$.

3. A hologram preparing apparatus comprising:

an interferable-light source;

a beam splitter which is arranged in an optical path of an interferable light beam emitted from said interferable-light source;

a pattern generating device including a plurality of reversible phase-modulating elements each comprising an irregular ferroelectric crystal plate in which each set of mutually opposing end planes are normal to one of *a*-, *b*- and *c*-axis, and a thickness between said end planes is prescribed with respect to a difference $\Delta n$ in the refractive index between light beams having wavelength $\lambda$ and having their polarization planes respectively parallel to said *a*- and *b*-axis within the crystal and to a positive integer P by $$\frac{\lambda}{2 \cdot \Delta n}(P + ½)\text{, and}$$

means for applying a voltage, sufficient to invert the spontaneous polarization of said irregular ferroelectric crystal plate by 180°, to said irregular ferroelectric crystal plate and in parallel to said *c*-axis, polarizing means which is arranged in front of and in opposition to one end plane of one set of said mutually opposing end planes of said irregular ferroelectric crystal plate of said reversible phase-modulating element, a polarization plane of said polarizing means being arranged in parallel to one of said *a*- and *b*-axis of said end planes of said irregular ferroelectric crystal plate, said irregular ferroelectric plates, which constitute the respective elements, being arranged on a plane normal to incident light, one of said *a*- and *b*-axis on one set of said mutually opposing end planes of said each crystal plate being arranged in parallel to a predetermined linear polarization plane, which is arranged in an optical path of one of the light beams split by said beam splitter, and which has the split light beam as the incident light beam;

a Fourier transform lens which is arranged in said optical path of said light beam split by said beam splitter, and immediately adjacent said pattern generating device;

a hologram recording medium which is arranged at a rear focalposition of said Fourier transform lens;

polarizing means which is arranged in the other beam path split by said beam splitter; and optical means which directs the linearly polarized beam, having passed through said polarizing means, to said hologram medium at a predetermined angle, whereby a hologram of a pattern image of said pattern generating device is prepared.

4. A hologram preparing apparatus according to claim 3, wherein said irregular ferroelectric crystal plate is made of $Gd_2 (MoO_4)_3$.

5. A method of preparing a hologram with a hologram preparing apparatus including a interferable-light source;

polarizing means which is arranged in an optical path of light beam emitted by said interferable-light source, and which converts said interferable light beam into a linearly polarized beam;

a beam splitter which is arranged in an optical path of said linearly polarized beam converted by said polarizing means;

a pattern generating device including a plurality of reversible phase-modulating elements each comprising an irregular ferroelectric crystal plate in which each set of mutually opposing end planes are normal to one of *a*-, *b*- and *c*-axis, and a thickness between said end planes is prescribed with respect to a difference $\Delta n$ in the refractive index between light beams having a wavelength $\lambda$ and having their polarization planes respectively parallel to said *a*- and *b*-axis within the crystal and to a positive integer P by $$\frac{\lambda}{2 \cdot \Delta n}(P + ½)\text{, and}$$

means for applying a voltage, sufficient to invert the spontaneous polarization of said irregular ferroelectric crystal plate by 180°, to said irregular ferroelectric crystal plate and in parallel to said *c*-axis, said irregular ferroelectric crystal plates, which constitute the respective elements, being arranged on a plane normal to an incident linearly polarized beam so as to form a matrix among them, one of said *a*- and *b*-axis on said mutually opposing end planes of said each crystal plate being arranged in parallel to a polarization plane of said incident linearly polarized beam, which is arranged in an optical path of one of the linearly polarized beams split by said beam splitter, and which has the split linearly polarized beam as the incident linearly polarized beam;

a Fourier transform lens which is arranged in said optical path of said linearly polarized split beam of said beam splitter, and on one side of said pattern generating device;

a hologram recording medium which is arranged at a rear focal position of said Fourier transform lens; and optical means which directs the other linearly polarized beam, split by said beam splitter, to said hologram recording medium at a predetermined angle, whereby a hologram of a pattern image of said pattern generating device is prepared, comprising the steps of:

1. applying a voltage sufficient to invert spontaneous polarization by 180°, separately to reversible modulator elements of a bit group, generating a predetermined information pattern and to reversible modulator elements of a bit group, generating no pattern among said respective reversible phase-modulating elements which constitute said pattern generating device, said spontaneous polarization having random polarities among the respective bits;
2. focussing the pattern image of said pattern generating device, having undergone the above step (1), to said hologram medium;
3. thereafter, applying a voltage sufficient to invert by 180° the spontaneous polarization of said reverisble modulator elements of said bit group, generating no pattern, in the step (1); and
4. focussing the pattern image of said pattern generating device, having undergone the step (3), to said hologram recording medium having undergone the step (2).

6. A method of preparing a hologram according to claim 5, wherein said irregular ferroelectric crystal plate is made of $Gd_2 (MoO_4)_3$.

7. A method of preparing a hologram with a hologram preparing apparatus including:

an interferable-light source;

a beam splitter which is arranged in an optical path of an interferable light beam emitted from said interferable-light source;

a pattern generating device including a plurality of reversible phase-modulating elements each comprising an irregular ferroelectric crystal plate in which each set of mutually opposing end planes are normal to one of *a*-, *b*- and *c*-axis, and a thickness between said end planes is prescribed with respect to a difference $\Delta n$ in the refractive index between light beams having a wavelength $\lambda$ and having their polarization planes respectively parallel to said *a*- and *b*-axis within the crystal and to a positive integer P by $$\frac{\lambda}{2 \cdot \Delta n}(p + ½) \text{, and}$$

means for applying a voltage, suficient to invert the spontaneous polarization of said irregular ferroelectric crystal plate by 180°, to said irregular ferroelectric crystal plate and in parallel to said *c*-axis, polarizing means which is arranged in front of and in opposition to one end plane of one set of said mutually opposing end planes of said irregular ferroelectric crystal plate of said reversible phase modulating element, a polarization plane of said polarizing means being arranged in parallel to one of said *a*- and *b*-axis of said end planes of said irregular ferroelectric crystal plate, said irregular ferroelectric crystal plates, which constitute the respective elements, being arranged on a plane normal to incident light, one of said *a*-and *b*-axis on one set of said mutually opposing end planes of said each crystal plate being arranged in parallel to a predetermined linear polarization plane, which is arranged in an optical path of one of the light beams split by said beam splitter, and which has the split light beam as the incident light beam;

a Fourier transform lens which is arranged in said optical path of said light beam split by said beam splitter, and immediately adjacent said pattern generating device;

a hologram recording medium which is arranged at a rear focal position of said Fourier transform lens;

polarizing means which is arranged in the other beam path split by said beam splitter; and optical means which directs the linearly polarized beam, having passed through said polarizing means, to said hologram medium at a predetermined angle, comprising the steps of:

1. imparting a voltage sufficient to invert spontaneous polarization by 180°, separately to reversible phase modulating elements of a bit group generating a predetermined information pattern and to reversible phase-modulating elements of a bit group generating no pattern among said respective reversible phase-modulating elements of said pattern generating device, said spontaneous polarization having random polarities among the respective bits;
2. causing said hologram recording medium of said hologram preparing apparatus to sense a hologram pattern image of the pattern image of said pattern generating device having undergone the above step (1);
3. thereafter, applying a spontaneous-polarization 180° inverting voltage of a polarity opposite to that obtained by the step (1), to the respective bits of said bit group having undergone the step (1), so as to not generate the intended information pattern; and
4. causing said hologram recording medium, having undergone the step (2), to doubly sense the hologram image of said pattern generating device.

8. A method of preparing a hologram according to claim 7, wherein said irregular ferroelectric crystal plate is made of $Gd_2 (MoO_4)_3$.

* * * * *